(12) United States Patent
Guo et al.

(10) Patent No.: US 12,323,793 B2
(45) Date of Patent: Jun. 3, 2025

(54) EDGE ENABLER CLIENT IDENTIFICATION AUTHENTICATION PROCEDURES

(71) Applicant: Apple Inc., Cupertino, CA (US)

(72) Inventors: Shu Guo, Beijing (CN); Dawei Zhang, Saratoga, CA (US); Haijing Hu, Los Gatos, CA (US); Haitong Sun, Cupertino, CA (US); Huarui Liang, Beijing (CN); Lanpeng Chen, Beijing (CN); Mona Agnel, Guildford (GB); Robert Zaus, Munich (DE); Wei Zeng, Saratoga, CA (US); Weidong Yang, San Diego, CA (US); Xiaoyu Qiao, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/759,877

(22) PCT Filed: Aug. 6, 2021

(86) PCT No.: PCT/CN2021/111339
§ 371 (c)(1),
(2) Date: Aug. 1, 2022

(87) PCT Pub. No.: WO2023/010576
PCT Pub. Date: Feb. 9, 2023

(65) Prior Publication Data
US 2024/0251238 A1    Jul. 25, 2024

(51) Int. Cl.
*H04W 12/06* (2021.01)
*H04W 60/00* (2009.01)
*H04W 84/18* (2009.01)

(52) U.S. Cl.
CPC ........... *H04W 12/06* (2013.01); *H04W 60/00* (2013.01); *H04W 84/18* (2013.01)

(58) Field of Classification Search
CPC ... H04W 12/04; H04W 12/06; H04W 12/069; H04W 12/08; H04W 12/71; H04W 60/00; H04W 84/18
See application file for complete search history.

(56) References Cited

U.S. PATENT DOCUMENTS

| 2020/0359218 | A1  | 11/2020 | Lee et al. |
| 2021/0282012 | A1* | 9/2021  | Lee ..................... H04L 63/0807 |
| 2021/0307089 | A1* | 9/2021  | Kim ....................... H04W 4/50 |

(Continued)

FOREIGN PATENT DOCUMENTS

| CN | 113132897   | 7/2021 |
| WO | 2021/137579 | 7/2021 |

OTHER PUBLICATIONS

"Technical Specification Group Services and System Aspects; Study on Security Aspects of Enhancement of Support for Edge Computing in 5GC (Release 17)", 3GPP TR 33.839, v0.6.0, May 31, 2021, 75 sheets.

*Primary Examiner* — Khawar Iqbal
(74) *Attorney, Agent, or Firm* — Fay Kaplun & Marcin, LLP (57) ABSTRACT

An edge enabler server of an edge data network is configured to receive a verification request comprising an edge enabler client identification (EEC ID), wherein the EEC ID uniquely identifies an edge enabler client (EEC), determine whether the EEC ID is an authorized EEC ID and provide a verification response based on whether the EEC ID is authorized.

20 Claims, 9 Drawing Sheets

(56) References Cited

U.S. PATENT DOCUMENTS

| | | | | |
|---|---|---|---|---|
| 2022/0110081 | A1* | 4/2022 | Gupta | H04W 12/48 |
| 2022/0345442 | A1* | 10/2022 | Lee | H04L 67/10 |
| 2023/0062452 | A1* | 3/2023 | Kim | H04W 60/00 |
| 2023/0070253 | A1* | 3/2023 | Rajadurai | H04W 12/06 |
| 2023/0232228 | A1* | 7/2023 | Wu | H04W 76/10 |
| 2023/0254804 | A1* | 8/2023 | Gupta | H04W 12/08 370/329 |
| 2023/0388788 | A1* | 11/2023 | Kunz | H04W 12/106 |
| 2024/0073672 | A1* | 2/2024 | Bi | H04W 8/14 |
| 2024/0236676 | A9* | 7/2024 | Jost | H04W 4/50 |
| 2024/0244033 | A1* | 7/2024 | Takakura | H04W 76/18 |
| 2024/0276217 | A1* | 8/2024 | Wang | H04L 9/0866 |
| 2024/0314552 | A1* | 9/2024 | Kunz | H04L 65/1073 |

* cited by examiner

EDGE ENABLER CLIENT IDENTIFICATION AUTHENTICATION PROCEDURES

TECHNICAL FIELD

This application relates generally to wireless communication, and in particular relates to Edge Enabler Client Identification Authentication Procedures.

BACKGROUND

A user equipment (UE) may connect to an edge data network to access edge computing services. Edge computing refers to performing computing and data processing at the network where the data is generated. To establish a connection with the edge data network, the UE may have to perform an authentication procedure with an edge configuration server (ECS).

The UE may invoke an application client and an edge enabler client (EEC) to perform the authentication procedure with the ECS. The EEC may have an EEC identification (EEC-ID) that is authorized using an Authentication and Key Management for Applications (AKMA) procedure. The AKMA procedure generates a key $K_{AKMA}$ based on another unique key ($K_{AUSF}$) that is generated for the UE. However, the UE may instantiate multiple EECs, meaning that each EEC would have the same $K_{AKMA}$. Thus, when EEC authentication is based on AKMA, there will be a key collision issue because every EEC is using the same $K_{AKMA}$.

SUMMARY

Some exemplary embodiments are related to an edge enabler server of an edge data network configured to perform operations. The operations include receiving a verification request comprising an edge enabler client identification (EEC ID), wherein the EEC ID uniquely identifies an edge enabler client (EEC), determining whether the EEC ID is an authorized EEC ID and providing a verification response based on whether the EEC ID is authorized.

Other exemplary embodiments are related to an edge configuration server of an edge data network configured to perform operations. The operations include receiving an application registration request from an edge enabler client (EEC) instantiated on a user equipment (UE), the application registration request comprising an EEC identification (EEC ID), wherein the EEC ID uniquely identifies the EEC and verifying the EEC ID.

Still further exemplary embodiments are related to an Authentication and Key Management for Applications (AKMA) anchor function (AAnF) of a core network configured to perform operations. The operations include receiving an authentication verification request from an edge configuration server of an edge data network, the authentication verification request comprising an edge enabler client (EEC) identification (EEC ID) and other information used to authenticate an EEC, sending a verification request to an edge enabler server (EES) of the edge data network to request authentication of the EEC ID and receiving a verification response from the EES based on whether the EEC ID is authorized.

Additional exemplary embodiments are related to a processor of a user equipment (UE) configured to perform operations. The operations include instantiating an edge enabler client (EEC) corresponding to an application client requesting access to an edge data network, wherein the EEC has EEC identification (EEC ID) that uniquely identifies the EEC, generating a key corresponding to the requested access by the application client or EEC, authenticating the EEC ID as an authorized EEC ID and when the EEC ID is authenticated, sending an application registration request comprising the EEC ID to the edge data network.

DETAILED DESCRIPTION

The exemplary embodiments may be further understood with reference to the following description and the related appended drawings, wherein like elements are provided with the same reference numerals. The exemplary embodiments relate to implementing an authentication and authentication procedure for an edge enabler client (EEC) using an EEC identification (EEC-ID).

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein for edge computing. Therefore, the 5G NR network as described herein may represent any network that includes the functionalities associated with edge computing.

The UE may access an edge data network via a 5G NR network. The edge data network may provide the UE with access to edge computing services. Edge computing refers to performing computing and data processing at the network where the data is generated. In contrast to legacy approaches that utilize a centralized architecture, edge computing is a distributed approach where data processing is localized towards the network edge, closer to the end user. This allows performance to be optimized and latency to be minimized.

The exemplary embodiments are further described with regard to an edge configuration server (ECS) and an edge enabler server (EES). The EES and ECS may perform operations related to the authentication and authorization procedure for access to an edge data network. However, reference to an EES and an ECS is merely provided for illustrative purposes. The exemplary embodiments may be utilized with any electronic component that is configured with the hardware, software, firmware and/or cloud computing functionality to exchange information with the UE. Therefore, the EES and ECS as described herein are used to represent any appropriate electronic component or function resident in the network.

As described above, the UE, when performing authentication of an edge enabler client (EEC) with an edge data network may use an Authentication and Key Management for Applications (AKMA) procedure. The AKMA procedure generates a key ($K_{AKMA}$) based on another unique key ($K_{AUSF}$) that is generated for the UE. However, the UE may instantiate multiple EECs, meaning that each EEC would have the same $K_{AKMA}$. Thus, when EEC authentication is based on AKMA, there will be a key collision issue because every EEC is using the same $K_{AKMA}$.

In the exemplary embodiments, the UE and the edge data network are configured to use an EEC identification (EEC ID) as part of the AKMA procedure when performing authentication of the EEC. The EEC ID is a unique identification that is assigned by a global authority (e.g., GSMA, ITU, etc.). This allows each EEC instantiated by the UE to be separately authenticated to avoid the key collision issue and any malicious attacks on the edge network.

In some exemplary embodiments, the EEC ID authentication takes place in the edge data network, (e.g., between the ECS and EES). In other exemplary embodiments, the EEC ID authentication takes place at the UE. Each of these exemplary embodiments will be described in greater detail below.

Figure 1:
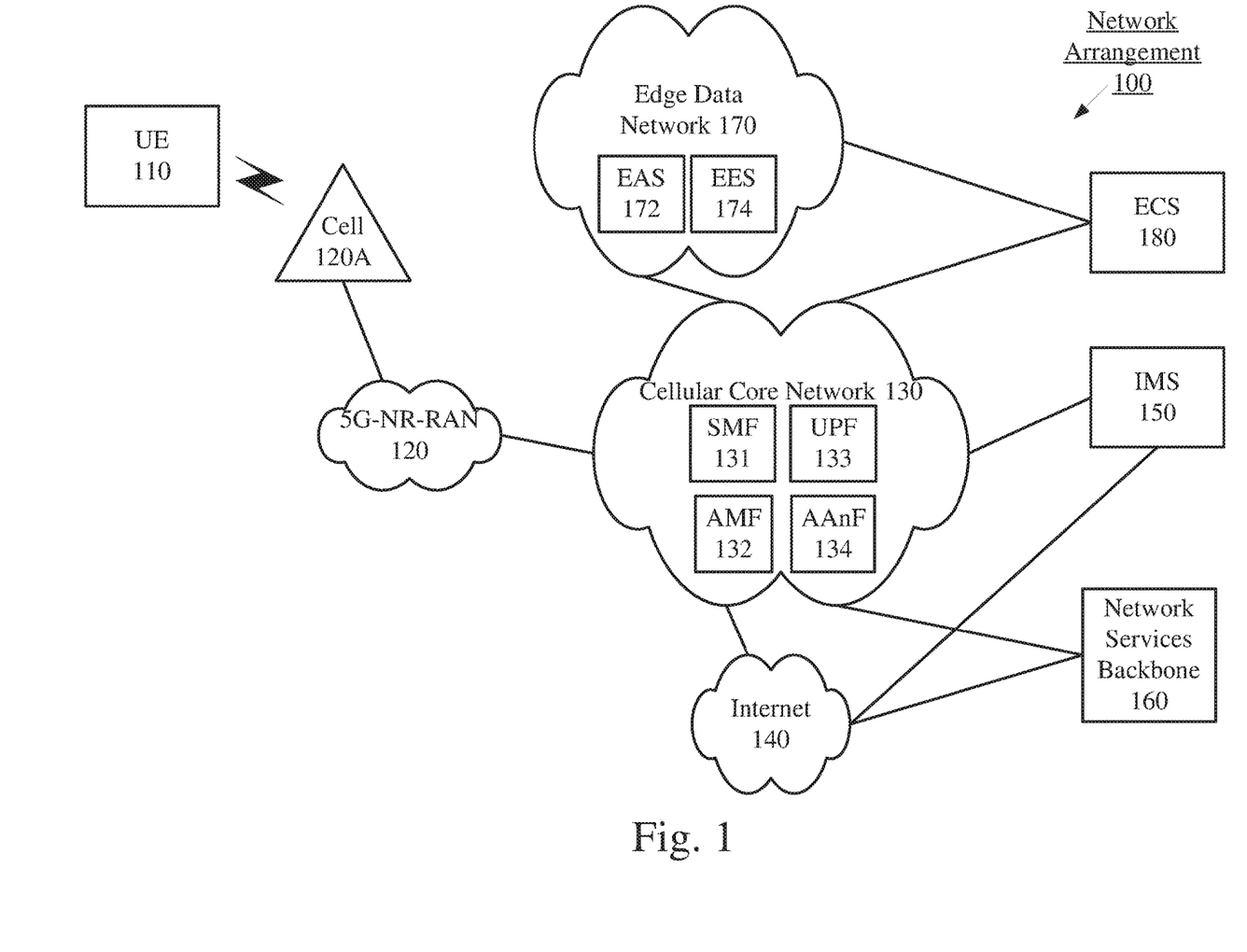
FIG. 1 shows an exemplary network arrangement according to various exemplary embodiments.

FIG. 1 shows an exemplary network arrangement 100 according to various exemplary embodiments. The exemplary network arrangement 100 includes UE 110. Those skilled in the art will understand that the UE 110 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, other types of Internet of Things (IoT) devices, etc. An actual network arrangement may include any number of UEs being used by any number of users. Thus, the example of a single UE 110 is only provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, an LTE RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a cell 120A that represents a gNB. However, an actual network arrangement may include any number of different types of cells being deployed by any number of RANs. Thus, the example of a single cell 120A is merely provided for illustrative purposes.

The UE 110 may connect to the 5G NR-RAN 120 via the cell 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cell 120A). However, as mentioned above, reference to the 5G NR-RAN 120 is merely for illustrative purposes and any appropriate type of RAN may be used.

The network arrangement 100 also includes a cellular core network 130. The cellular core network 130 may be considered to be the interconnected set of components or functions that manage the operation and traffic of the cellular network. In this example, the components include an authentication server function (AUSF) 131, a unified data management (UDM) 132, a session management function (SMF) 133, and an AKMA anchor function (AAnF) 134. It should be understood that an actual cellular core network may include various other components performing any of a variety of different functions.

The AUSF 131 may store data for authentication of UEs and handle authentication-related functionality. The AUSF 131 may be equipped with one or more communication interfaces to communicate with other network components (e.g., network functions, RANs, UEs, etc.). The exemplary embodiments are not limited to a AUSF that performs the above reference operations. Those skilled in the art will understand the variety of different types of operations a AUSF may perform. Further, reference to a single AUSF 131 is merely for illustrative purposes, an actual network arrangement may include any appropriate number of AUSFs.

The UDM 132 may perform operations related to handling subscription-related information to support the network's handling of communication sessions. The UDM 132 may be equipped with one or more communication interfaces to communicate with other network components (e.g., network functions, RANs, UEs, etc.). The exemplary embodiments are not limited to an UDM that performs the above reference operations. Those skilled in the art will understand the variety of different types of operations a UDM may perform. Further, reference to a single UDM 132 is merely for illustrative purposes, an actual network arrangement may include any appropriate number of UDMs.

The SMF 133 performs operations related to session management such as, but not limited to, session establishment, session release, IP address allocation, policy and quality of service (QoS) enforcement, etc. The SMF 133 may be equipped with one or more communication interfaces to communicate with other network components (e.g., network functions, RANs, UEs, etc.). The exemplary embodiments are not limited to an SMF that performs the above reference operations. Those skilled in the art will understand the variety of different types of operations a SMF may perform. Further, reference to a single SMF 133 is merely for illustrative purposes, an actual network arrangement may include any appropriate number of SMFs.

The AAnF 134 enables the AKMA Anchor Key ($K_{AKMA}$) derivation for AKMA services. Before invoking the AKMA service, a UE 110 will have successfully registered to the cellular core network 130, which results in the $K_{AUSF}$ of the UE being stored at the AUSF 131 and the UE 110 after a successful primary authentication. The AUSF 131 authentication procedure is defined by the Third Generation Partnership (3GPP) standards and is outside the scope of the exemplary embodiments. Those skilled in the art will understand the variety of different types of operations an AAnF 134 may perform. Further, reference to a single AAnF 134 is merely for illustrative purposes, an actual network arrangement may include any appropriate number of AAnFs.

The network arrangement 100 also includes the Internet 140, an IP Multimedia Subsystem (IMS) 150, and a network services backbone 160. The cellular core network 130 manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

In addition, the network arrangement 100 includes an edge data network 170 and an edge configuration server (ECS) 180. The edge data network 170 includes an edge application server (EAS) 172 and an edge application server (EES) 174. The exemplary embodiments are described with regard to implementing an authentication and authorization procedure between the UE 110 and the ECS 180. In some exemplary embodiments, the EES 174 will be part of the authentication procedure. The edge data network 170 and an ECS 180 will be described in more detail below with regard to FIG. 3. Those skilled in the art will understand that illustrating the EAS 172 and EES 174 inside the edge data network 170 and the ECS 180 outside the edge data network 170 is only exemplary. Each of these functions may reside within or outside the edge data network 170.

Figure 2:
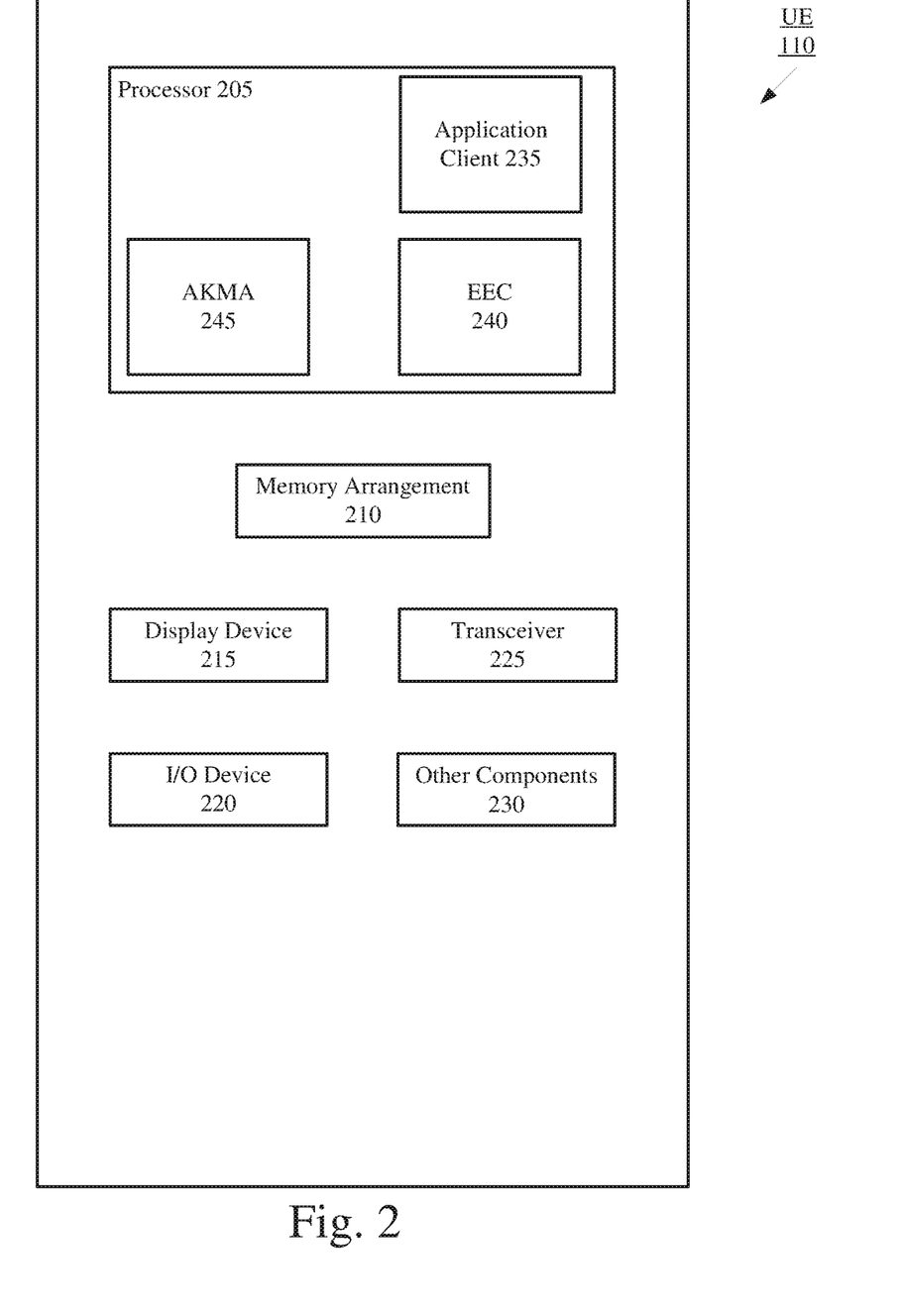
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute various types of software. For example, the processor may execute an application client 235, an edge enabler client (EEC) 240 and an AKMA engine 245. The application client 235 may perform operations related to an application running on the UE 110 exchanging application data with a server via a network. The EEC 240 may perform operations related to establishing a connection to the edge data network 170. As described above, the UE 110 may invoke multiple application clients 235 resulting in the instantiation of multiple EECs 240. The illustration of a single application client 235 and a single EEC 240 is only exemplary. The AKMA engine 245 performs operations related to the authentication of each EEC 240 instantiated by the UE 110. The operations of the application client 235, the EEC 240 and the AKMA engine 245 are discussed in more detail below with regard to the signaling diagrams of FIGS. 4-6.

The above referenced software being executed by the processor 205 is only exemplary. The functionality associated with the software may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
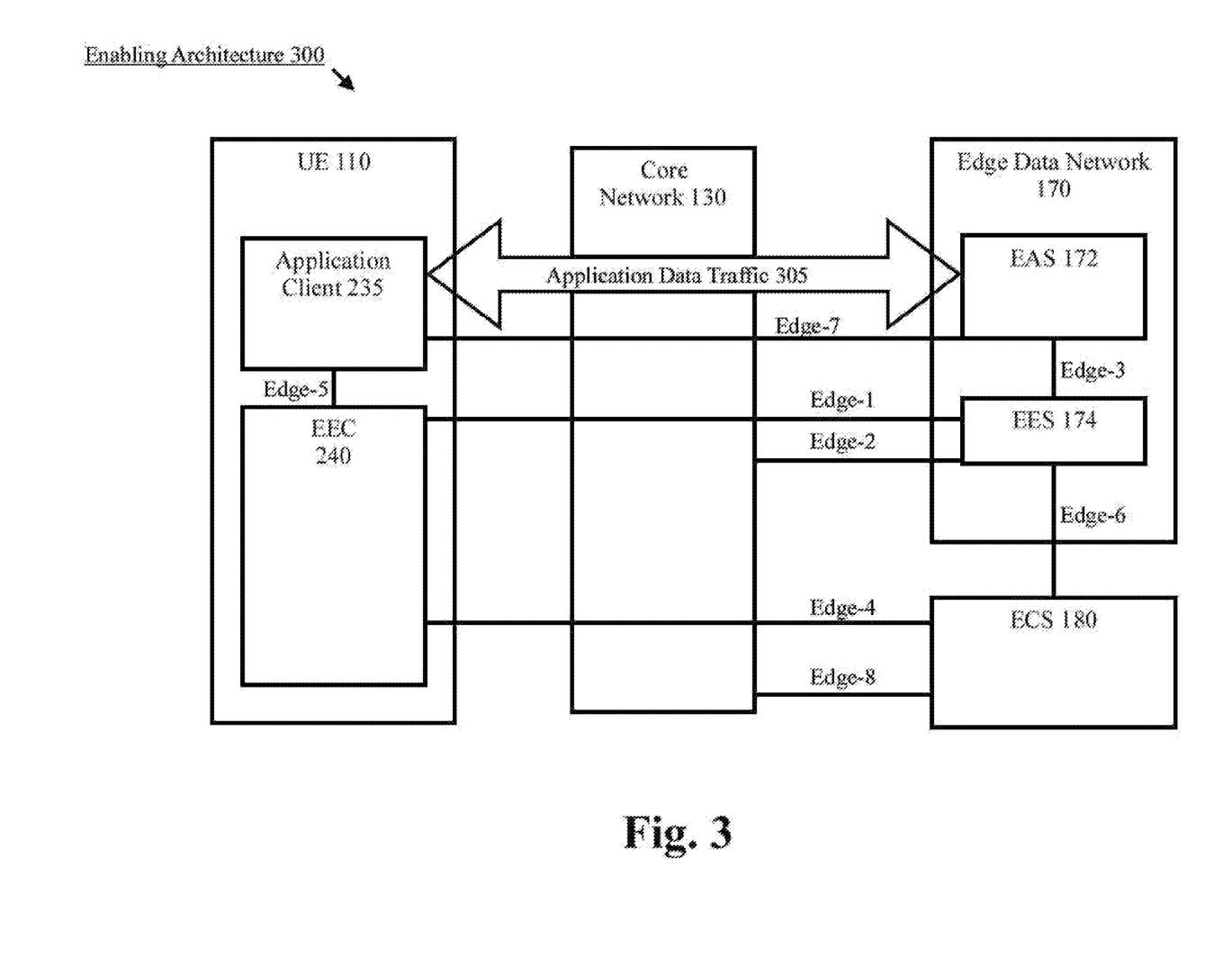
FIG. 3 shows an architecture for enabling edge applications according to various exemplary embodiments.

FIG. 3 shows an architecture 300 for enabling edge applications according to various exemplary embodiments. The architecture 200 will be described with regard to the network arrangement 100 of FIG. 1.

The exemplary embodiments will be described with regard to an authentication and authorization procedure between the EEC 240 of the UE 110 and the ECS 180. Successful completion of the exemplary procedure may precede the flow of application data traffic between the edge data network 170 and the UE 110. The architecture 300 provides a general example of the type of components that may interact with one another when the UE 110 is configured to exchange application data traffic with the edge data network 170. A specific example of the exemplary authentication and authorization procedure will be provided below with regard to the signaling diagrams 400, 500 and 600 of FIGS. 4-6.

The architecture 300 includes the UE 110, the core network 130 and the edge data network 170. The UE 110 may establish a connection to the edge data network 170 via the core network 130 and various other components (e.g., cell 120A, the 5G NR RAN 120, network functions, etc.).

In the architecture 300, the various components are shown as being connected via reference points labeled edge-x (e.g., edge-1, edge-2, edge-3, edge-4, edge-5, edge-6, edge-7, edge-8, etc.). Those skilled in the art will understand that each of these reference points (e.g., connections, interfaces, etc.) are defined in the 3GPP Specifications. The exemplary architecture arrangement 300 is using these reference points in the manner in which they are defined in the 3GPP Specifications. Furthermore, while these interfaces are termed reference points throughout this description, it should be understood that these interfaces are not required to be direct wired or wireless connections, e.g., the interfaces may communicate via intervening hardware and/or software components. To provide an example, the UE 110 exchanges communications with the gNB 120A. However, in the architecture 300 the UE 110 is shown as having a connection to the ECS 180. However, this connection is not a direct communication link between the UE 110 and the ECS 180. Instead, this is a connection that is facilitated by intervening hardware and software components. Thus, throughout this description the terms "connection," "reference point" and "interface" may be used interchangeably to describe the interfaces between the various components in the architecture 300 and the network arrangement 100.

During operation, application data traffic 305 may flow between the application client 235 running on the UE 110 and the EAS 172 of the edge data network 170. The EAS 172 may be accessed through the core network 130 via uplink classifiers (CL) and branching points (NP) or in any other appropriate manner. Those skilled in the art will understand the variety of different types of operations and configurations relevant to an application client and an EAS 172. The operations performed by these components are beyond the scope of the exemplary embodiments. Instead, these components are included in the description of the architecture 300 to demonstrate that the exemplary authentication and authorization procedure between the UE 110 and the ECS 180 may precede the flow of application data traffic 305 between the UE 110 and the edge data network 170.

The EEC 240 may be configured to provide supporting functions for the application client 235. For example, the EEC 240 may perform operations related to concepts such as, but not limited to, the discovery of EASs that are available in an edge data network (e.g., EAS 172) and the retrieval and provisioning of configuration information that may enable the exchange of the application data traffic 305 between the application client 235 and the EAS 172. To differentiate the EEC 240 from other EECs, the EEC 240 may be associated with a globally unique value (e.g., EEC ID) that identifies the EEC 240. As described above, the EEC-ID may be assigned by a global authority. Further, reference to a single application client 235 and EEC 240 is merely provided for illustrative purposes, the UE 110 may be equipped with any appropriate number of application clients and EECs.

The edge data network 170 may also include an edge enabler server (EES) 174. The EES 174 may be configured to provide supporting functions to the EAS 172 and the EEC 240 running on the UE 110. For example, the EES 174 may perform operations related to concepts such as, but not limited to, provisioning configuration to enable the exchange of the application data traffic 305 between the UE 110 and the EAS 172 and providing information related to the EAS 172 to the EEC 240 running on the UE 110. Those skilled in the art will understand the variety of different types of operations and configurations relevant to an EES 174. In some exemplary embodiments, as described below, the EES 174 performs operation to authenticate the EEC ID for the ECS 180. Further, reference to the edge data network 170 including a single EAS 172 and a single EES 174 is merely provided for illustrative purposes. In an actual deployment scenario, an edge data network may include any appropriate EASs and EESs interacting with any number of UEs.

The ECS 180 may be configured to provide supporting functions for the EEC 240 to connect to the EES 174. For example, the ECS 180 may perform operations related to concepts such as, but not limited to, provisioning of edge configuration information to the EEC 240. The edge configuration information may include the information for the EEC 240 to connect to the EES 174 (e.g., service area information, etc.) and the information for establishing a connection with the EES 174 (e.g., uniform resource identifier (URI). Those skilled in the art will understand the variety of different types of operations and configurations relevant to an ECS.

In the network architecture 100 and the enabling architecture 300, the ECS 180 is shown as being outside of the edge data network 170 and the core network 130. However, this is merely provided for illustrative purposes. The ECS 180 may be deployed in any appropriate virtual and/or physical location (e.g., within the mobile network operator's domain or within a third party domain) and implemented via any appropriate combination of hardware, software and/or firmware.

As indicated above, the interaction between the ECS 180 and the EEC 240 running on the UE 110 may occur prior to the flow of the application data traffic 305. The exemplary embodiments relate to an authentication and authorization procedure between the UE 110 and the ECS 180. Specifically, the authentication and authorization procedure is based on at least the EEC ID of the EEC 240.

Figure 4:
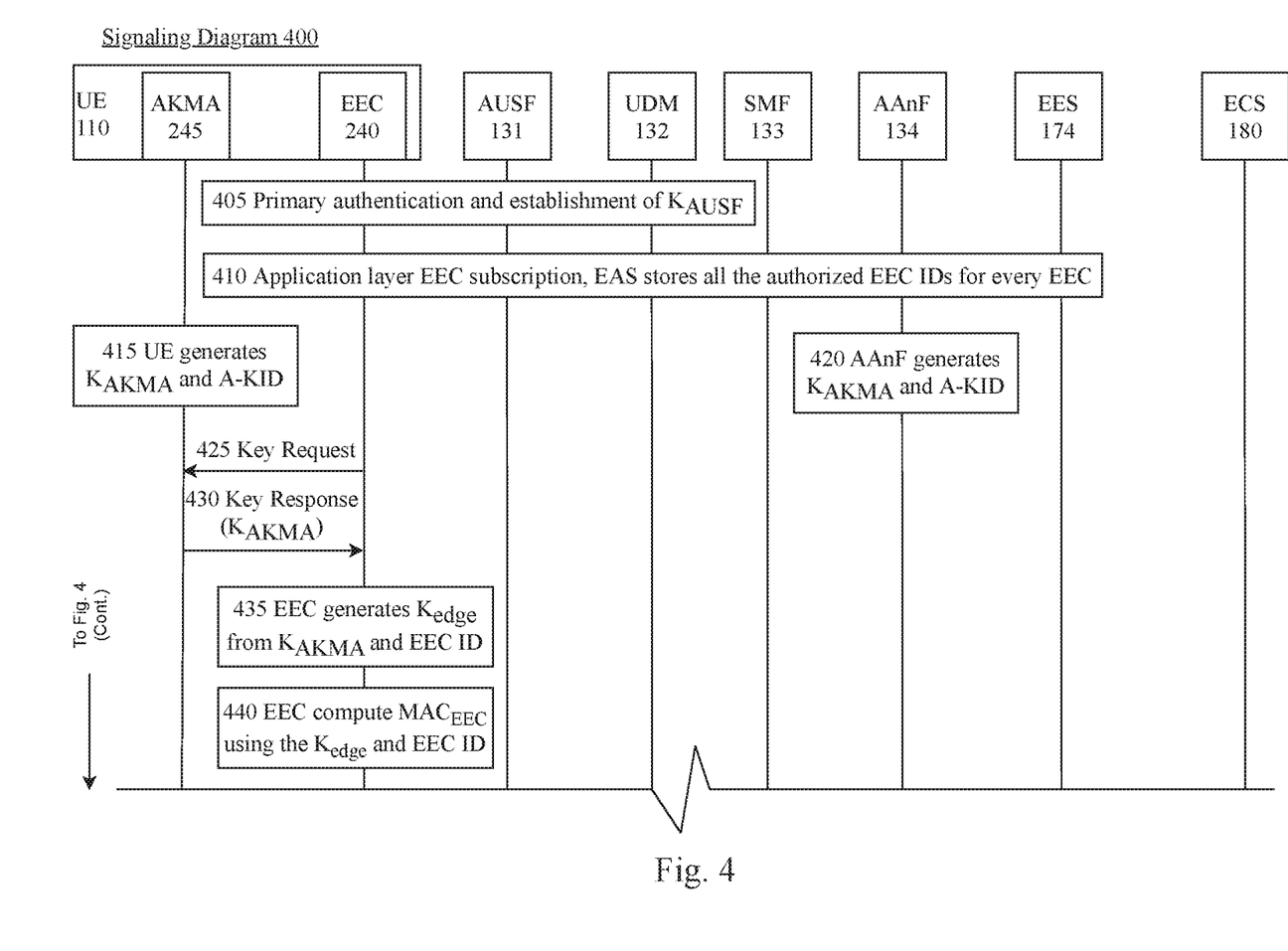
FIG. 4 shows a first signaling diagram for an authentication and authorization procedure where the edge enabler client (EEC) identification (EEC ID) ID of an EEC is authenticated by an edge enabler server (EES) according to various exemplary embodiments.

FIG. 4 shows a first signaling diagram 400 for an authentication and authorization procedure where the EEC ID of an EEC 240 is authenticated by an EES 174 according to various exemplary embodiments. The signaling diagram 400 will be described with regard to the enabling architecture 300 of FIG. 3, the UE 110 of FIG. 2 and the network arrangement 100 of FIG. 1.

The signaling diagram 400 includes the UE 110 that includes the AKMA 245 and the EEC 240. The signaling diagram further includes the AUSF 131, the UDM 132, the SMF 133, the AAnF 134, the EES 174 and the ECS 180. As will be described in more detail below, the EES 174 will authenticate the EEC ID of the EEC 240.

Those skilled in the art will understand that the primary authentication procedure (e.g., 5G AKA, EAP-AKA, etc.) generally refers to an authentication procedure between the UE 110 and the core network 130. During the procedure, the AUSF 131 may generate a credential $K_{AUSF}$ via authentication vector generation. The $K_{AUSF}$ may then be used for further operations of the primary authentication procedure. Some characteristics of the $K_{AUSF}$ include i) the $K_{AUSF}$ may be shared between the UE 110 and AUSF of the home public land mobile network (HPLMN) (e.g., AUSF 131) and ii) the $K_{AUSF}$ may provide the basis of the subsequent 5G key hierarchy.

The signaling diagram 400 assumes that the UE 110 and the core network 130 have already successfully performed the primary authentication procedure and the credential (KAUSF) is available. However, reference to $K_{AUSF}$ is merely provided for illustrative purposes, the exemplary embodiments may apply to any similar type of 3GPP credential or information being used in addition or instead of $K_{AUSF}$.

In addition, for the purposes of the signaling diagram 400, it may be considered that the credentials generated by primary authentication cannot be sent outside of the carrier's network. Further, it may also be considered that the UE 110 has already discovered the edge data network 170 and is permitted to initiate this exemplary edge computing authentication and authorization procedure.

In 405, the UE 110 performs primary authentication with the network. As indicated above, the procedure may result in the credential ($K_{AUSF}$) being shared between the UE 110 and the AUSF 131. However, the exemplary embodiments are not limited to the use of $K_{AUSF}$, any other appropriate parameters may be utilized.

In 410, the UE 110 instantiates the application client 235 and the corresponding EEC 240. In the signaling diagram 400, it may be considered that the EES 174/ECS 180 store a list of all the authorized EEC IDs. In 415, the AKMA engine 245 generates the KARMA and an AKMA key identifier (A-KID) using, for example, the AKMA procedure as described in 3GPP TS 33.535. As described above, the KARMA is generated based on the $K_{AUSF}$. The A-KID is an identifier that corresponds to the generated $K_{AKMA}$. The $K_{AKMA}$ and the A-KID are stored securely by the UE 110. In 420, the AAnF 134 similarly generates the KARMA and the A-KID based on the $K_{AUSF}$ using, for example, the AKMA procedure as described in 3GPP TS 33.535 and stores them securely.

In 425 and 430, the EEC 240 fetches the $K_{AKMA}$ from the AKMA engine 245. As described above, because the $K_{AKMA}$ is based on the $K_{AUSF}$, there is only one $K_{AKMA}$ per UE 110. Thus, every instantiated EEC 240 of the UE 110 will fetch the same $K_{AKMA}$ from the AKMA engine 245.

In 435, the EEC 240 generates a credential KEDGE from the $K_{ARMA}$ and the EEC ID. Since each EEC 240 has a unique EEC ID, the KEDGE for each EEC 240 of the UE 110 will be unique even though the $K_{ARMA}$ is the same for all EECs 240 of the UE 110. In 440, the EEC computes a $MAC_{EEC}$ using the KEDGE and the EEC ID.

In 445, the UE 110 sends an application registration request including the EEC ID, $MAC_{EEC}$, and the A-KID to the ECS 180. The application registration request may be sent, for example, using a non-access stratum (NAS) or the user plane.

In 450, the ECS 180 sends an EEC ID verification request including the EEC ID of the EEC 240 to the EES 174 to determine if this EEC ID is authorized. In some exemplary embodiments, the EES 174 may have a locally stored list of authorized EEC IDs. In these exemplary embodiments, the EES 174 will check the locally stored list to determine whether the EEC ID of the EEC 240 is authorized. In other exemplary embodiments, the list may be stored remote from the EES 174 and the EES 174 may access the remote storage to determine whether the EEC ID of the EEC 240 is authorized.

In still further exemplary embodiments, the list may be stored in the ECS 180 and the ECS 180 may check locally to determine whether the EEC ID of the EEC 240 is authorized. Those skilled in the art will understand that when the ECS 180 store the list locally, the operations 450 and 455 (e.g., the exchange of messages between the ECS 180 and the EES 174) may not be performed because the information used to verify the EEC ID is stored on the ECS 180.

In 455, the EES 174 sends an EEC ID verification response to the ECS 180. A negative response ends the process as the EEC ID is not authorized and the authentication procedure is considered to be unsuccessful. However, if the EEC ID is authorized, the ECS 180, in 460, sends an authentication verification including the EEC ID, the $MAC_{EEC}$ and the A-KID to the AAnF 134 for EEC authentication verification.

In 465, the AAnF 134 retrieves the $K_{ARMA}$ using the A-KID that was sent in the authentication verification from the ECS 180. As described above, the $K_{AKMA}$ and A-KID for the EEC 240 were independently generated and stored by the AAnF 134 in operation 420. The AAnF 134 may then calculate the KEDGE from the $K_{AKMA}$ and the EEC ID and finally verify the $MAC_{EEC}$ using the KEDGE and the EEC ID.

If the verification by the AAnF 134 of 465 is successful, in 470, the AAnF 134 sends an authentication verification response (success) back to the ECS 180. Otherwise, the AAnF 134 sends an authentication verification response (fail) to the ECS 180. Based on the verification results, the ECS 180, in 475, decides whether to accept or reject the authentication request, and sends an authentication request accept/rejection to the EEC 240 of the UE 110.

As can be seen from the above authentication and authorization procedure, the EEC 240 may use the unique EEC ID to perform the procedure. This allows the EEC 240 to perform the AKMA procedure while resolving the issue with only a single $K_{AKMA}$ for multiple EECs in each UE.

Figure 5:
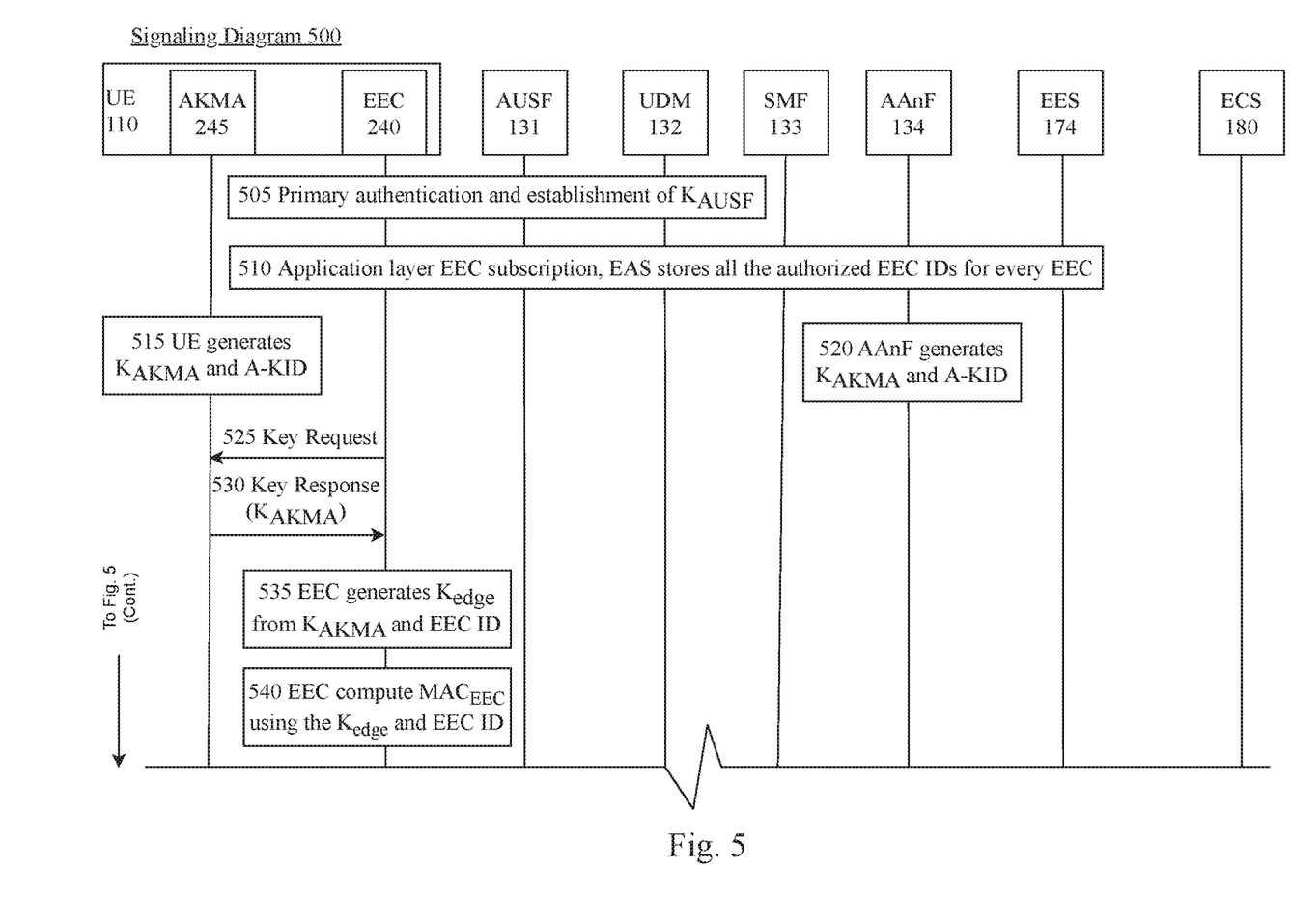
FIG. 5 shows a second signaling diagram for an authentication and authorization procedure where the EEC ID of an EEC is authenticated by an EES according to various exemplary embodiments.

FIG. 5 shows a second signaling diagram 500 for an authentication and authorization procedure where the EEC ID of an EEC 240 is authenticated by an EES 174 according to various exemplary embodiments. The signaling diagram 400 will be described with regard to the enabling architecture 300 of FIG. 3, the UE 110 of FIG. 2 and the network arrangement 100 of FIG. 1.

The signaling diagram 400 includes the UE 110 that includes the AKMA 245 and the EEC 240. The signaling diagram further includes the AUSF 131, the UDM 132, the SMF 133, the AAnF 134, the EES 174 and the ECS 180. As will be described in more detail below, the EES 174 will authenticate the EEC ID of the EEC 240. The difference between signaling diagram 400 and signaling diagram 500 is as follows. In signaling diagram 400, the ECS 180 sends the EEC ID verification request to the EES 174. In signaling diagram 500, the AAnF 134 sends the EEC ID verification request to the EES 174.

Initially, the operations 505-545 are the same as the operations 405-445 of FIG. 4 and therefore will not be described again. In 550, the ECS 180 sends an authentication verification including the EEC ID, the $MAC_{EEC}$ and the A-KID to the AAnF 134 for EEC authentication verification. Prior to performing any authentication, the AAnF 134, in 555, sends an EEC ID verification request including the EEC ID of the EEC 240 to the EES 174 to determine if this EEC ID is authorized. Similar to the embodiments described above, in some exemplary embodiments, the EES 174 may have a locally stored list of authorized EEC IDs. In these exemplary embodiments, the EES 174 will check the locally stored list to determine whether the EEC ID of the EEC 240 is authorized. In other exemplary embodiments, the list may be stored remote from the EES 174 and the EES 174 may access the remote storage to determine whether the EEC ID of the EEC 240 is authorized.

In 560, the EES 174 sends an EEC ID verification response to the AAnF 134. A negative response ends the process as the EEC ID is not authorized and the authentication procedure is considered to be unsuccessful. However, if the EEC ID is authorized, the AAnF 134, in 565, retrieves the $K_{AKMA}$ using the A-KID that was sent in the authentication verification from the ECS 180. The AAnF 134 may then calculate the KEDGE from the $K_{AKMA}$ and the EEC ID and finally verify the $MAC_{EEC}$ using the KEDGE and the EEC ID.

If the verification by the AAnF 134 of 565 is successful, in 570, the AAnF 134 sends an authentication verification response (success) back to the ECS 180. Otherwise, the AAnF 134 sends an authentication verification response (fail) to the ECS 180. Based on the verification results, the ECS 180, in 575, decides whether to accept or reject the authentication request, and sends an authentication request accept/rejection to the EEC 240 of the UE 110.

Similar to the example of FIG. 4, the signaling of FIG. 5 allows the EEC 240 to use the unique EEC ID to perform the authentication and authorization procedure. This allows the EEC 240 to perform the AKMA procedure while resolving the issue with only a single $K_{ARMA}$ for each UE.

Figure 6:
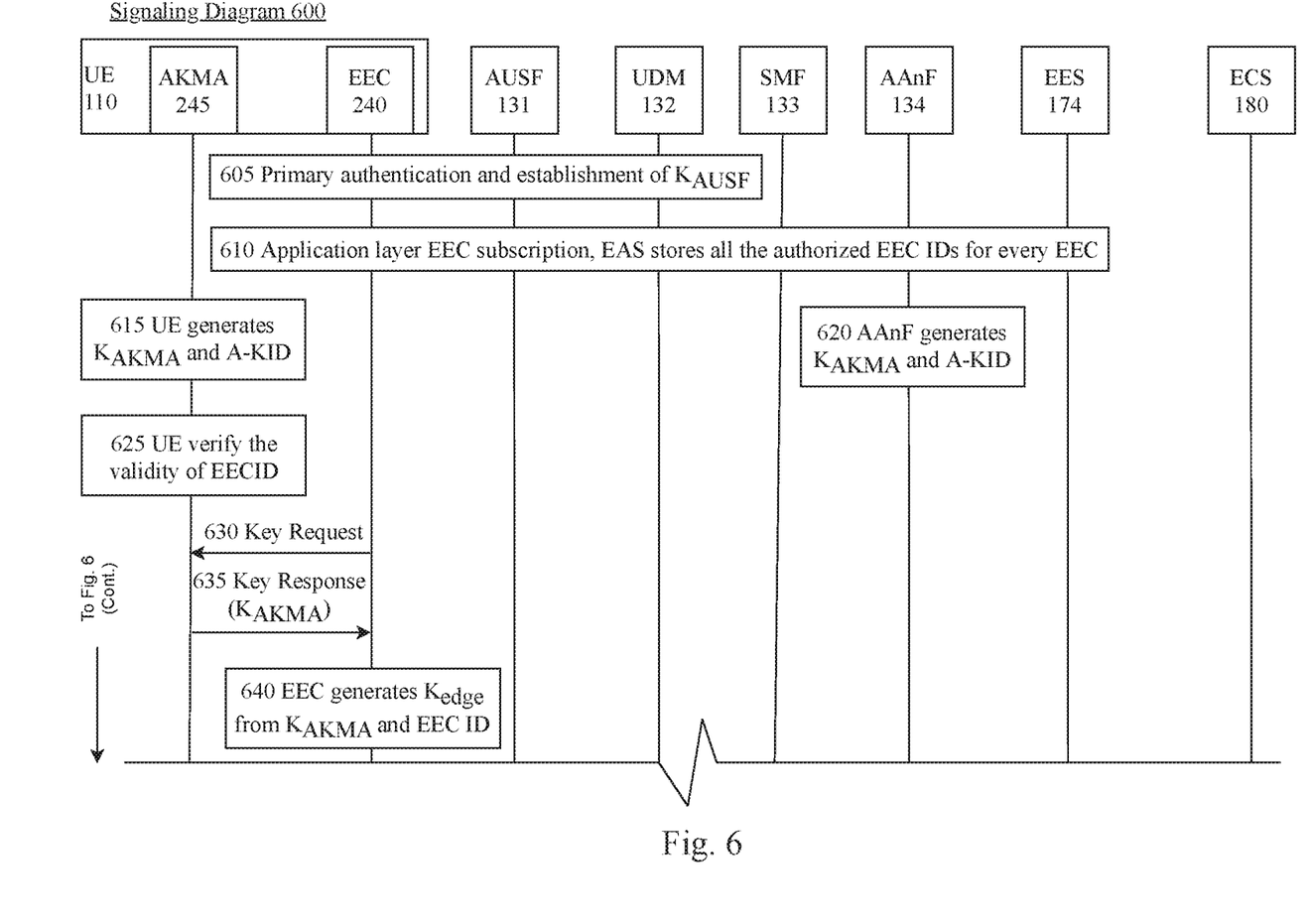
FIG. 6 shows a signaling diagram for an authentication and authorization procedure where the EEC ID of an EEC is authenticated by the UE according to various exemplary embodiments.

FIG. 6 shows a signaling diagram 600 for an authentication and authorization procedure where the EEC ID of an EEC 240 is authenticated by the UE 110 according to various exemplary embodiments. The signaling diagram 600 will be described with regard to the enabling architecture 300 of FIG. 3, the UE 110 of FIG. 2 and the network arrangement 100 of FIG. 1.

The signaling diagram 600 includes the UE 110 that includes the AKMA 245 and the EEC 240. The signaling diagram further includes the AUSF 131, the UDM 132, the SMF 133, the AAnF 134, the EES 174 and the ECS 180. As will be described in more detail below, the UE 110 will authenticate the EEC ID of the EEC 240.

Initially, the operations 605-620 are the same as the operations 405-420 of FIG. 4 and therefore will not be described again with the following exception. In 610, there may be some credentials stored for the EEC IDs. For example, a certificate may be stored in an application client 235 or in an EEC 240 for the authentication to be performed in subsequent operations. The credentials may be used for the subsequent verification of the EEC ID by the UE 110.

In 625, the UE 110 will verify the validity of EEC 240 including the EEC ID. An exemplary method of verification may be based on the certificates that are stored for each application client/EEC as described above for 610. If the EEC 240 passes the verification check in 625, the authentication procedure may continue to 630 where the EEC may fetch the $K_{ARMA}$ from the AKMA engine 245. For example, when the EEC 240 is requesting $K_{AKMA}$ from the AKMA engine 245 using a key request, the certificate of the AC/EEC may be carried in this request, the AKMA engine 245 may check this certificate first, before the AKMA engine 245 sends the $K_{AKMA}$ to the EEC 240.

Again, the remaining operations 630-670 are similar to the corresponding operations described above for the signaling diagrams 400 and 500 and therefore will not be described again.

Thus, the signaling of FIG. 6 accomplishes the same results as the signaling of FIGS. 4 and 5, except that the authentication of the EEC ID is performed at the UE rather than at the EES. That is, the signaling of FIG. 6 allows the EEC 240 to use the unique EEC ID to perform the authentication and authorization procedure while resolving the issue with only a single $K_{ARMA}$ for multiple EECs in each UE.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. An edge enabler server of an edge data network configured to perform operations comprising:
   receiving, from an edge configuration server (ECS) of the edge data network, a verification request comprising an edge enabler client identification (EEC ID), wherein the EEC ID uniquely identifies an edge enabler client (EEC);
   determining whether the EEC ID is an authorized EEC ID based on an authorized list of EEC IDs stored remotely from the edge enabler server; and
   providing a verification response to the ECS based on whether the EEC ID is authorized.

2. The edge enabler server of claim 1, wherein the verification request is received from an Authentication and Key Management for Applications (AKMA) anchor function (AAnF) of a core network to which the edge data network is communicatively coupled.

3. The edge enabler server of claim 1, wherein the verification response indicates a success when the EEC ID is authorized.

4. The edge enabler server of claim 1, wherein the verification response indicates a failure when the EEC ID is not authorized.

5. An edge configuration server of an edge data network configured to perform operations comprising:
   receiving an application registration request from an edge enabler client (EEC) instantiated on a user equipment (UE), the application registration request comprising an EEC identification (EEC ID), wherein the EEC ID uniquely identifies the EEC;
   sending a verification request to an edge enabler server (EES) of the edge data network to request authentication of the EEC ID; and
   receiving a verification response from the EES based on whether the EEC ID is authorized.

6. The edge configuration server of claim 5, wherein the edge configuration server locally stores an authorized list of EEC IDs and wherein the verifying the EEC ID comprises querying the locally stored authorized list of EEC IDs.

7. The edge configuration server of claim 5, further configured to perform operations comprising:
   when the EEC ID is authorized, sending an authentication verification to an Authentication and Key Management for Applications (AKMA) anchor function (AAnF) of a core network to which the edge data network is communicatively coupled, the authentication verification comprising the EEC ID and other information used to authenticate the EEC;

receiving an authentication response from the AAnF; and when the authentication response indicates a successful authentication of the EEC, accepting the application registration request from the EEC.

8. The edge configuration server of claim 7, wherein the other information used to authenticate the EEC includes at least a $MAC_{EEC}$.

9. The edge configuration server of claim 7, wherein the other information used to authenticate the EEC includes at least an AKMA key identifier (A-KID).

10. The edge configuration server of claim 5, further configured to perform operations comprising:

when the EEC ID is not authorized, sending an authentication verification response failure message based on the authentication procedure to the edge configuration server.

11. An Authentication and Key Management for Applications (AKMA) anchor function (AAnF) of a core network configured to perform operations comprising:

receiving an authentication verification request from an edge configuration server (ECS) of an edge data network, the authentication verification request comprising an edge enabler client (EEC) identification (EEC ID) and other information used to authenticate an EEC;

sending a verification request to an edge enabler server (EES) of the edge data network to request authentication of the EEC ID; and receiving a verification response from the EES based on whether the EEC ID is authorized.

12. The AAnF of claim 11, further configured to perform operations comprising:

when the EEC ID is authorized, performing an authentication procedure using the EEC ID and the other information to authenticate the EEC; and sending an authentication verification response based on the authentication procedure to the edge configuration server.

13. The AAnF of claim 11, further configured to perform operations comprising:

storing a $K_{AKMA}$ and an AKMA key identifier (A-KID) that were independently generated.

14. The AAnF of claim 13, wherein generating the $K_{AKMA}$ and the AKMA key is based on a $K_{AUSF}$ key.

15. The AAnF of claim 13, wherein the $K_{AKMA}$ and the AKMA key were generated using the AKMA procedure as described in 3GPP TS 33.535.

16. The AAnF of claim 13, further configured to perform operations comprising:

retrieving the $K_{AKMA}$ using the A-KID.

17. The AAnF of claim 16, further configured to perform operations comprising:

calculating a KEDGE from the $K_{AKMA}$.

18. The AAnF of claim 17, further configured to perform operations comprising:

verifying the $MAC_{EEC}$ using the KEDGE and the EEC ID.

19. The AAnF of claim 11, wherein the verification response indicates a success when the EEC ID is authorized.

20. The AAnF of claim 11, wherein the verification response indicates a failure when the EEC ID is not authorized.

* * * * *